United States Patent
Nakashima (10) Patent No.: US 12,280,636 B2
(45) Date of Patent: Apr. 22, 2025

(54) BLOWOUT STRUCTURE OF AIR CONDITIONER

(71) Applicant: HONDA MOTOR CO., LTD., Tokyo (JP)

(72) Inventor: Yu Nakashima, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 377 days.

(21) Appl. No.: 17/868,211

(22) Filed: Jul. 19, 2022

(65) Prior Publication Data
US 2023/0025113 A1    Jan. 26, 2023

(30) Foreign Application Priority Data

Jul. 21, 2021 (JP) ................................. 2021-120553

(51) Int. Cl.
*B60H 1/34* (2006.01)
*F24F 13/15* (2006.01)
*F24F 140/40* (2018.01)

(52) U.S. Cl.
CPC ........... *B60H 1/3421* (2013.01); *F24F 13/15* (2013.01)

(58) Field of Classification Search
CPC .............................. B60H 1/3421; F24F 13/15
See application file for complete search history.

(56) References Cited

U.S. PATENT DOCUMENTS

| | | | |
|---|---|---|---|
| 2006/0223430 A1* | 10/2006 | Shibata | F24F 13/075 454/155 |
| 2007/0232216 A1* | 10/2007 | Shibata | B60H 1/3421 454/155 |
| 2014/0308889 A1 | 10/2014 | De et al. | |
| 2015/0004897 A1* | 1/2015 | Ishikawa | B60H 1/3421 454/155 |
| 2016/0116184 A1 | 4/2016 | Chappell et al. | |
| 2018/0334015 A1 | 11/2018 | Doll et al. | |
| 2019/0001791 A1 | 1/2019 | Matsuzawa et al. | |

FOREIGN PATENT DOCUMENTS

| | | |
|---|---|---|
| CN | 104956153 A | 9/2015 |
| CN | 108928216 A | 12/2018 |
| EP | 2955453 A1 | 12/2015 |
| JP | S58-97515 A | 6/1983 |

(Continued)

OTHER PUBLICATIONS

Atlas Foundry, Fillet All Sharp Angles, http://www.atlasfdry.com/casting-design7.htm (Year: 2014).*

(Continued)

*Primary Examiner* — Steven S Anderson, II
(74) *Attorney, Agent, or Firm* — Rankin, Hill & Clark LLP (57) ABSTRACT

A blowout structure of an air conditioner according to the present invention includes a wind direction adjuster that is arranged in a case, can change a direction of wind blown out according to a rotation angle, and closes a ventilation passage inside the case so as to inhibit blowout of the wind. Inside the case, a contact surface with which a wind direction adjuster 2 in a state of closing the ventilation passage comes into contact and a reverse surface that allows an airflow flowing back to the upstream side from the contact surface to be reversed to the downstream side.

4 Claims, 9 Drawing Sheets

(56) References Cited

FOREIGN PATENT DOCUMENTS

| | | | |
|---|---|---|---|
| JP | 2007-290431 A | | 11/2007 |
| JP | 2008-030511 A | | 2/2008 |
| JP | 3155548 U | | 11/2009 |
| JP | 2011-168140 A | | 9/2011 |
| JP | 2015-009615 A | | 1/2015 |
| JP | 2015152202 A | * | 8/2015 |
| JP | 2016-185753 A | | 10/2016 |
| JP | 2016-199074 A | | 12/2016 |
| JP | 2019-011009 A | | 1/2019 |
| WO | 2013/069316 A1 | | 5/2013 |

OTHER PUBLICATIONS

Hibino, JP-2015152202-A (Year: 2015).*
Japanese Office Action received in corresponding Japanese application No. 2021-120553 dated Apr. 25, 2023 with English translation (8 pages).
Chinese Office Action received in corresponding Chinese application No. 202210790686.3 dated Feb. 21, 2025 with English translation (18 pages).

* cited by examiner

BLOWOUT STRUCTURE OF AIR CONDITIONER

BACKGROUND OF THE INVENTION

1. Field of the Invention

The present invention relates to a blowout structure of an air conditioner.

2. Description of the Related Art

As a blowout structure (register) of an air conditioner, there has heretofore been known one having a case forming a ventilation passage inside and a fin (wind direction adjuster) which is arranged in the case, changes a direction of wind blown out according to a rotation angle, and closes the ventilation passage so as to inhibit blowout of wind (see, for example, Patent Literature 1). In such a blowout structure, when the fin is set in a fin shut state where the ventilation passage is closed, a contact area between the fin and a case inner wall surface is increased to improve airtightness by the fin. To be more specific, the blowout structure is configured such that a step is formed with a generation portion of the ventilation passage by narrowing the ventilation passage near an outlet of the wind, and the fin in the fin shut state has its plate surface come into contact with this step surface.

PRIOR ART DOCUMENT(S)

[Patent Literature(s)]
Patent Literature 1: JP2016-199074A

SUMMARY OF THE INVENTION

However, when the step is provided in the ventilation passage near the outlet as described above, a new problem arises that the wind stagnates in the step portion. In the blowout structure, good wind directivity by the fin (wind direction adjuster) is hindered the wind stagnation in the step portion.

It is an object of the present invention to provide a blowout structure of an air conditioner capable of achieving good airtightness by a wind direction adjuster in a state of closing a ventilation passage and achieving good wind directivity as compared with conventional structures.

A blowout structure of an air conditioner according to the present invention that solves the above problems includes: a case having a ventilation passage inside; and a wind direction adjuster that is arranged in the case, is configure to change a direction of wind blown out according to a rotation angle, and closes the ventilation passage so as to inhibit blowout of the wind. A contact surface formed so as to extend in a direction of intersecting with an extending direction of the ventilation passage, that is, a direction away from the ventilation passage so as to come into contact with the wind direction adjuster in a state of closing the ventilation passage, and a reverse surface that is provided so as to face the contact surface on the upstream side of the contact surface and allows an airflow flowing back to the upstream side from the contact surface to be reversed to the downstream side are formed inside the case.

The blowout structure of the present invention to provide can achieve good airtightness by a wind direction adjuster in a state of closing a ventilation passage and achieve good wind directivity as compared with conventional structures.

DETAILED DESCRIPTION OF THE EMBODIMENTS

Next, an embodiment for implementing a blowout structure of an air conditioner according to the present invention will be described in detail with reference to the drawings as appropriate.

The blowout structure of this embodiment is mainly characterized in that a contact surface is provided in a case so that a wind direction adjuster that closes a ventilation passage in the case comes into contact with the contact surface so as to improve airtightness, and a reverse surface is provided in the case that allows the airflow flowing back from the contact surface to the upstream side to be reversed to the downstream side.

In the following description, front, back, left, right, upper, and lower are based on the directions indicated by the arrows in each of the drawings that correspond to the front, back, left, right, upper, and lower of a vehicle equipped with this blowout structure.

Figure 1:
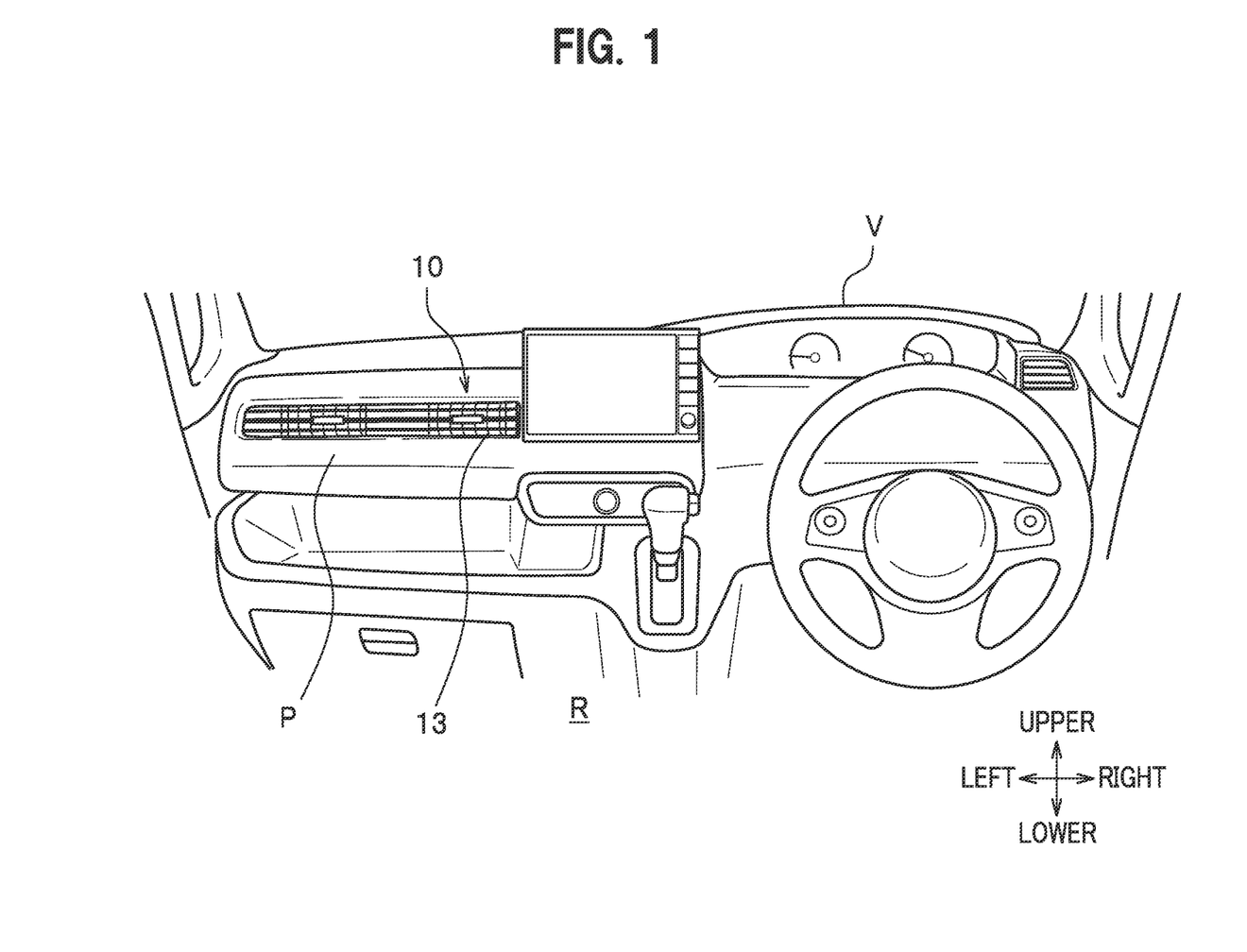
FIG. 1 is a front view of an instrument panel of a vehicle provided with a blowout structure according to an embodiment of the present invention.

FIG. 1 is a front view of an instrument panel P of a vehicle V provided with a blowout structure S according to this embodiment.

A plurality of the blowout structures S of this embodiment are arranged in line in a vehicle width direction so as to correspond to a driver seat and a passenger seat, respectively. The blowout structure S will be specifically described by taking one provided so as to correspond to the passenger seat as an example.

As shown in FIG. 1, the blowout structure S is attached to the instrument panel P so that its outlet 13 faces a vehicle interior R side. To be more specific, the outlet 13 is arranged on a vertical wall of the instrument panel P so as to face a passenger seated in the passenger seat (not shown).

Figure 2:
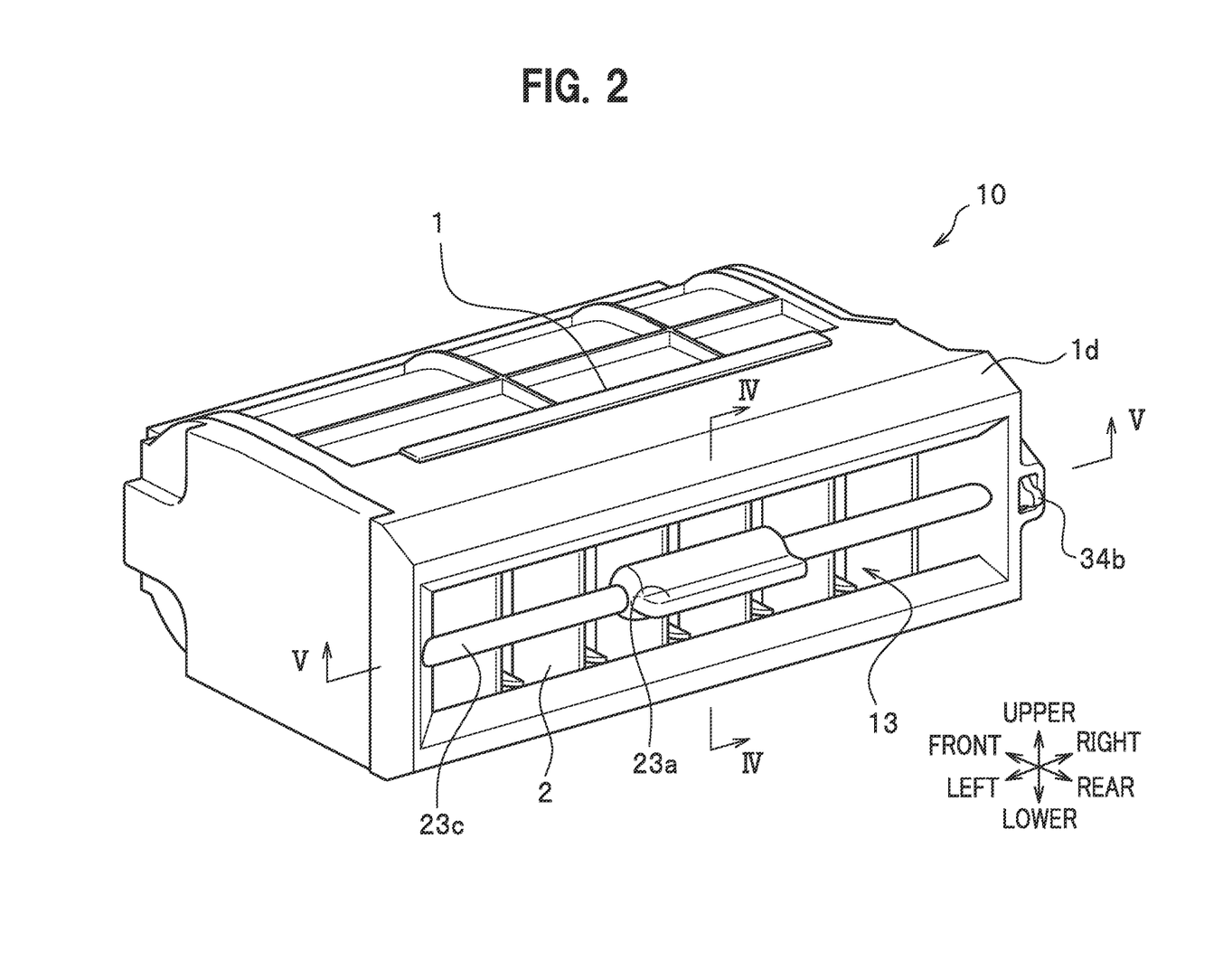
FIG. 2 is an overall perspective view of the blowout structure according to the embodiment of the present invention.
Figure 3:
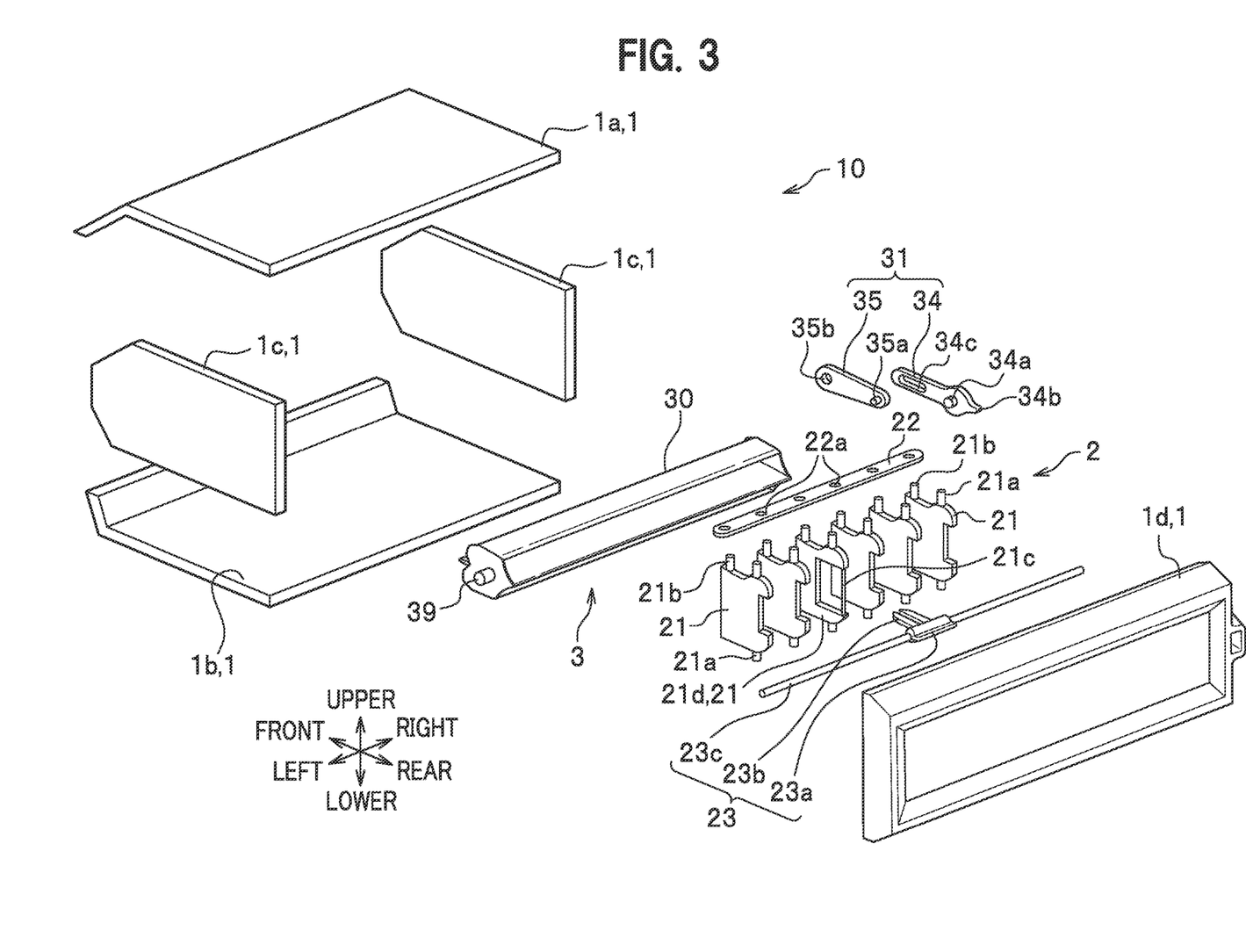
FIG. 3 is an exploded perspective view of the blowout structure shown in FIG. 2.

FIG. 2 is an overall perspective view of the blowout structure S. FIG. 3 is an exploded perspective view of the blowout structure S.

As shown in FIG. 2, the blowout structure S includes a case 1 made of a square cylinder and a first wind direction adjuster 2 housed in the case 1 on one end side (rear side in FIG. 2) of the case 1 that serves as the outlet 13. As shown in FIG. 3, the blowout structure S further includes a second wind direction adjuster 3 housed in the case 1 on the other end side (front side in FIG. 3) of the case 1. The first wind direction adjuster corresponds to a "wind direction adjuster" in the claims, while the second wind direction adjuster 3 corresponds to "another wind direction adjuster" in the claims.

<Case>

As shown in FIG. 3, the case 1 includes an upper plate member 1a, a lower plate member 1b, a side plate member 1c, and a bezel member 1d.

The case 1 forms the square cylinder by integrating these members 1a to 1d. A ventilation passage 5 (see FIG. 4) to be described later having a rectangular flow path cross-section is formed inside the case 1.

Figure 4:
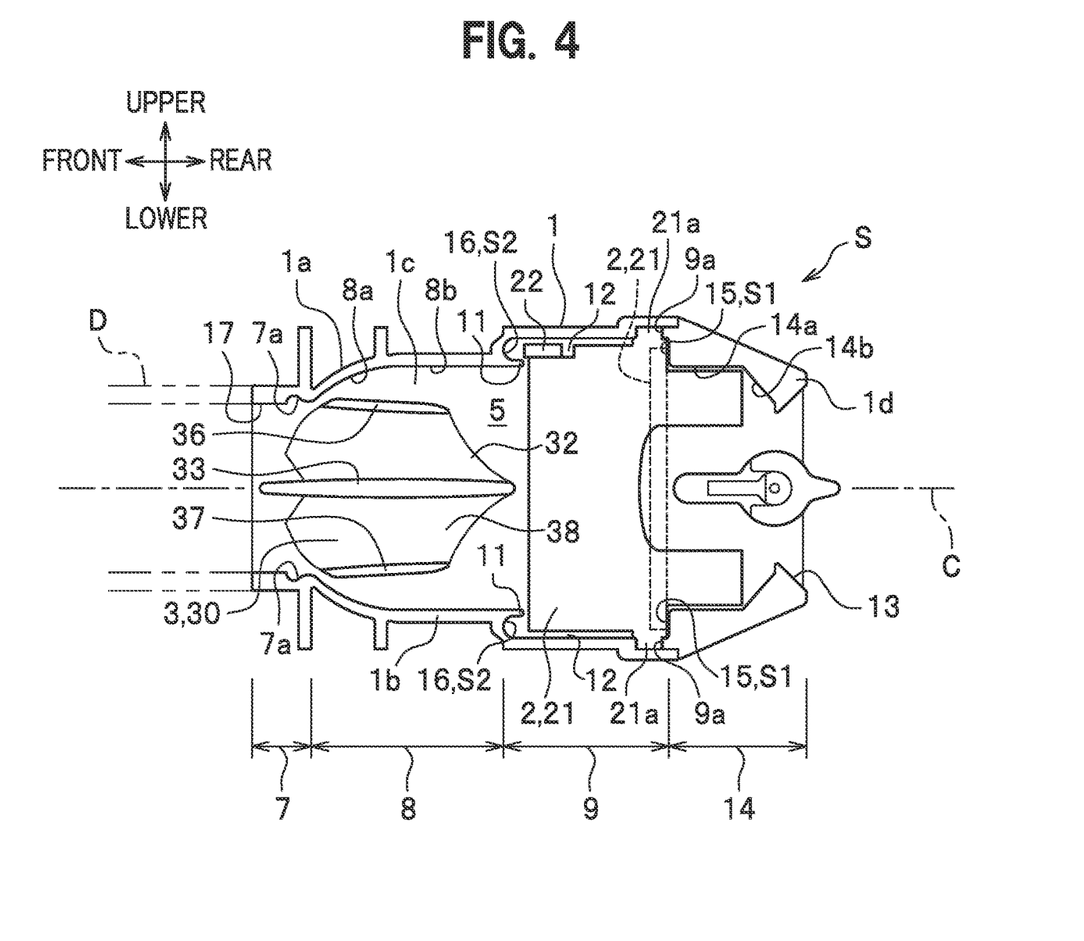
FIG. 4 is a cross-sectional view taken along the line IV-IV in FIG. 2.

FIG. 4 is a cross-sectional view taken along the line IV-IV in FIG. 2. In FIG. 4, reference numeral D denotes a duct indicated by a virtual line (chain double-dashed line), which serves as a blast passage from the air conditioner (not shown).

The upper and lower plate members 1a and 1b have symmetrical shapes with respect to a center line C extending in a front-rear direction of the case 1 in the side view shown in FIG. 4.

To be more specific, the upper and lower plate members 1a and 1b face each other, so that a duct connector 7, a drum fin arrangement portion 8, and a vertical fin arrangement portion 9 are formed between a pair of side plate members 1c (see FIG. 3).

The duct connector 7 is connected to the duct D and forms an inlet 17 of air (wind) in the blowout structure 10. The second wind direction adjuster 3 (drum fin 30) to be described later has its front end arranged inside the duct connector 7.

At the rear portion of the duct connector 7, stopper faces 7a that regulate the rotation angle of the drum fin 30 are formed on the plate member 1a and the lower plate member 1b, respectively. These stopper faces 7a that function as locks for the drum fin 30 will be described in detail later together with the drum fin 30.

The drum fin arrangement portion 8 is provided on the downstream side of the duct connector 7. In the drum fin arrangement portion 8, a vertical spacing between the upper and lower plate members 1a and 1b is wider than that in the duct connector 7 so that the drum fin 30 to be described later can be rotated at a predetermined angle about a shaft portion 39 (see FIG. 7) to be described later.

A curved portion 8a that is curved along the rotation locus of the rear portion of the drum fin 30 is formed in the front part of the drum fin arrangement portion 8.

The downstream side of the curved portion 8a in the drum fin arrangement portion 8 serves as a general portion 8b extending to the vertical fin arrangement portion 9 described below in which the spacing between the upper and lower plate members 1a and 1b is substantially constant.

The vertical fin arrangement portion 9 has a wider vertical spacing between the upper and lower plate members 1a and 1b than the general portion 8b of the drum fin arrangement portion 8. The vertical spacing between the upper and lower plate members 1a and 1b in the vertical fin arrangement portion 9 is substantially constant in the front-rear direction.

In the case 1, vertical wall surfaces 16 are formed on the upper and lower plate members 1a and 1b, respectively, so as to connect the step between the general portion 8b of the drum fin arrangement portion 8 and the vertical fin arrangement portion 9.

These vertical wall surfaces 16 are provided so as to face a vertical wall surface 15 (contact surface S1) of a bezel member 1d to be described later and, as will be described in detail later, form a reverse surface S2 for an airflow flowing back from the vertical wall surface 15 side.

Such a vertical wall surface 16 has a reverse portion 11 protruding toward the downstream side on the ventilation passage 5 side.

The vertical wall surface 16 (reverse surface S2) in this embodiment is a curved surface that is curved so as to be recessed toward the upstream side (front side). That is, the vertical wall surface 16 (reverse surface S2) faces the vertical wall surface 15 on the recessed surface. Note, however, that the vertical wall surface 16 may be a flat surface extending in the vertical direction, instead of the curved surface, as long as the vertical wall surface 16 has the reverse portion 11.

Inside such a vertical fin arrangement portion 9, a front-side portion of a vertical fin 21 included in the first wind direction adjuster 2 is arranged.

A vertical width of this front-side portion located in front of a rotation shaft 21a of the vertical fin 21 is wider than the vertical spacing between the upper and lower plate members 1a and 1b in the general portion 8b of the drum fin arrangement portion 8.

A bearing 9a of the rotation shaft 21a is formed at the rear portions of the upper and lower plate members 1a and 1b in the vertical fin arrangement portion 9. A front portion of the bezel member 1d to be described next is connected to the rear portions of the upper and lower plate members 1a and 1b and the side plate member 1c forming the vertical fin arrangement portion 9.

As shown in FIG. 3, the bezel member 1d is formed of a frame having a rectangular opening.

As shown in FIG. 4, the bezel member 1d is arranged on the most downstream side as the vehicle interior side of the case 1, and forms the outlet 13 of air blown from the air conditioner (not shown).

That is, inside the case 1, the ventilation passage 5 is formed for wind from the inlet 17 to the outlet 13.

Such a bezel member 1d has an airflow guide portion 14 inside.

As will be described in detail later, the airflow guide portion 14 is configured to guide the airflow changed inside the ventilation passage 5 in a predetermined direction according to the rotation angle of the drum fin 30.

As shown in FIG. 4, the airflow guide portion 14 includes: a general portion 14a having a vertical spacing substantially constant along the front-rear direction; and an inclined portion 14b that is connected to the rear side of the general portion 14a and inclined so that the vertical spacing is gradually narrowed toward the rear side.

The vertical spacing inside the bezel member 1d in the general portion 14a is set to be substantially equal to the vertical spacing between the upper and lower plate members 1a and 1b in the general portion 8b of the drum fin arrangement portion 8.

Inside such a general portion 14a, a rear portion of the vertical fin 21 located behind the rotation shaft 21a of the vertical fin 21 is arranged.

Upper and lower vertical wall surfaces 15 formed at the front end of the bezel member 1*d* as a step between the inside of the bezel member 1*d* and the vertical fin arrangement portion 9 in the general portion 14*a* serve as contact surfaces S1 of the vertical fin 21 in a fin shut state to be described in detail later.

These vertical wall surfaces 15 (contact surfaces S1) form a space portion 12 inside the case 1 with the vertical wall surfaces 16 (reverse surfaces S2). That is, the space portion 12 forms a step space outside the ventilation passage 5.

<First Wind Direction Adjuster>

As shown in FIG. 3, the first wind direction adjuster 2 mainly includes a plurality of vertical fins 21, a connecting member 22, and an operator 23.

The vertical fins 21 are made of a plate body and are arranged in the vehicle width direction (left-right direction) so that the plate surfaces are parallel to each other.

The vertical fin 21 includes a rotation shaft 21*a* supported by the bearing 9*a* (see FIG. 4) and a connecting pin 21*b* supported by the connecting member 22.

The rotation shaft 21*a* projects in the vertical direction from upper and lower edges of the vertical fin 21. The connecting pin 21*b* projects in the vertical direction from the upper edge of the vertical fin 21 on the upstream side of the rotation shaft 21*a*.

Among the plurality of vertical fins 21, one vertical fin 21*d* located in the middle in the left-right direction has an engaging pin 21*c* with which the operator 23 to be described later is engaged. The engaging pin 21*c* extends in the vertical direction on the downstream side of the rotation shaft 21*a*.

As shown in FIG. 3, the connecting member 22 has a plurality of holes 22*a* arranged at predetermined intervals along its longitudinal direction. The connecting pins 21*b* of the plurality of vertical fins 21 maintained in a parallel state are rotatably fitted into the holes 22*a*, respectively. Thus, the plurality of vertical fins 21 are integrally connected via the connecting member 22.

Such a connecting member 22 is disposed in the space portion 12 formed between the vertical wall surface 15 (contact surface S1) and the vertical wall surface 16 (reverse surface S2) as shown in FIG. 4.

The connecting member 22 is included in a rotation mechanism that rotates the vertical fin 21.

As shown in FIG. 3, the operator 23 includes a grip portion 23*a* for a user, a bifurcated portion 23*b* protruding forward from the grip portion 23*a*, and a guide bar 23*c* that slidably supports the grip portion 23*a* in the left-right direction.

Figure 5:
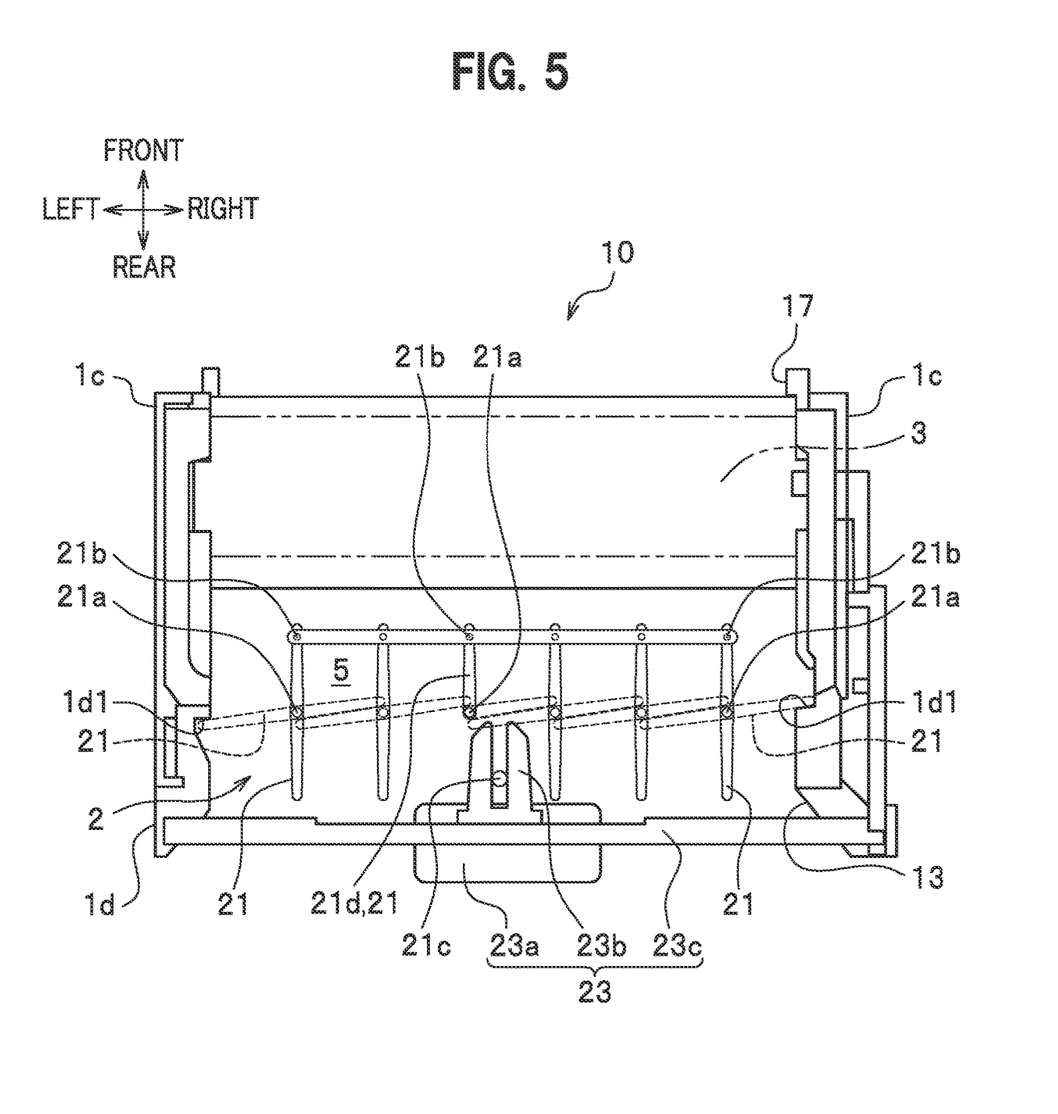
FIG. 5 is a cross-sectional view taken along the line V-V in FIG. 2, including a cross-section of a first wind direction adjuster (wind direction adjuster).

FIG. 5 is a cross-sectional view taken along the line V-V in FIG. 2, including a cross-section of the first wind direction adjuster 2.

As shown in FIG. 5, both ends of the guide bar 23*c* that supports the grip portion 23*a* are supported by the bezel member 1*d*. The engaging pin 21*c* of the vertical fin 21 described above is fitted into the bifurcated portion 23*b* of the operator 23 so as to be movable in the front-rear direction.

In the first wind direction adjuster 2 as described above, when the user slides the grip portion 23*a* of the operator 23 in the left-right direction, the engaging pin 21*c* of the vertical fin 21*d* rotates the vertical fin 21*d* around the rotation shaft 21*a* while moving in the front-rear direction inside the bifurcated portion 23*b*.

In this event, the other vertical fins 21 connected by the connecting member 22 via the connecting pins 21*b* of the vertical fins 21*d* are each rotated around each rotation shaft 21*a* in conjunction with the vertical fin 21*d*. Thus, the vertical fins 21 (including the vertical fin 21*d*) change the direction of windblown out of the outlet 13 according to the rotation angle.

The rotated vertical fins 21 (including the vertical fin 21*d*) overlap with each other as indicated by the dotted lines in FIG. 5 and are set in a fin shut state to close the outlet 13.

This fin shut state corresponds to a "state of closing a ventilation passage" in the claims.

As shown in FIG. 5 a stopper face 1*d*1 is formed inside the bezel member 1*d* as a lock to maintain the rotation angle of the vertical fin 21 in the fin shut state.

The vertical fins 21 in the fin shut state come into contact with the upper and lower vertical wall surfaces 15 (contact surfaces S1) of the bezel member 1*d* as indicated by the dotted lines in FIG. 4.

<Second Wind Direction Adjuster>

Next, the second wind direction adjuster 3 (see FIG. 3) will be described.

As shown in FIG. 3, the second wind direction adjuster 3 is arranged on the upstream side (front side) of the first wind direction adjuster 2.

The second wind direction adjuster 3 mainly includes a drum fin 30 and a link mechanism 31 for rotating the drum fin 30.

Figure 6:
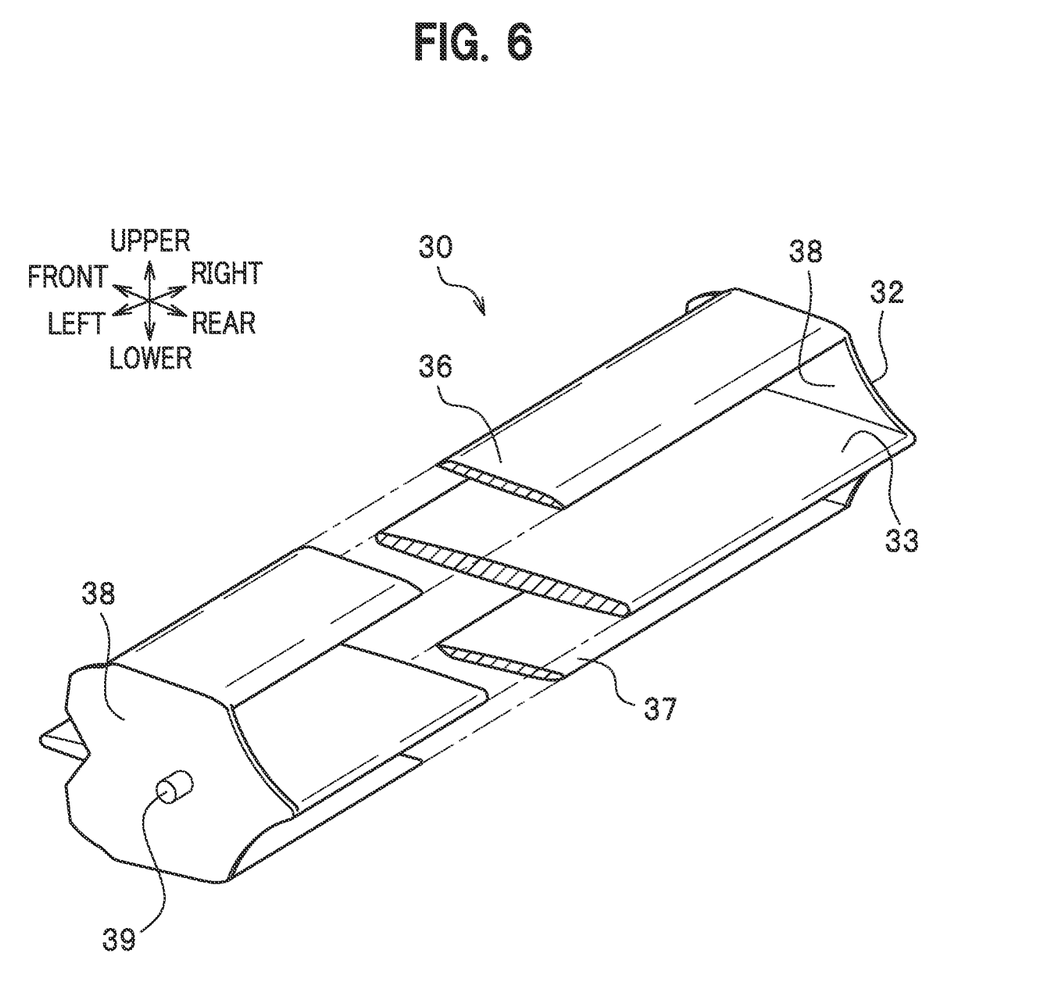
FIG. 6 is an overall perspective view of a drum fin included in a second wind direction adjuster (another wind direction adjuster).

FIG. 6 is an overall perspective view of the drum fin 30.

As shown in FIG. 6, the drum fin 30 is a member long in the vehicle width direction (left-right direction) and includes a square cylindrical drum fin main body 32 having an opening in the front-rear direction and an intermediate fin 33 formed of a flat plate-shaped horizontal fin for partitioning the inside of the drum fin main body 32 into upper and lower sections.

The drum fin main body 32 includes an upper fin 36 and a lower fin 37, which are formed of flat plate-shaped horizontal fins, and end plates 38.

The upper and lower fins 36 and 37 are each formed of a plate long in the left-right direction with a rectangular planar shape. The upper and lower fins 36 and 37 are also set to have substantially the same width in the front-rear direction.

Referring back to FIG. 4, spacing between the upper and lower fins 36 and 37 is gradually reduced from the upstream side toward the downstream side. That is, the opening cross-sectional area on the rear side (downstream side) of the drum fin main body 32 is slightly smaller than that on the front side (upstream side).

As shown in FIG. 6, the intermediate fin 33 is formed of a plate long in the left-right direction with a rectangular planar shape. The intermediate fin 33 is wider than the front-rear width of the upper fin 36 (or the lower fin 37).

The intermediate fin 33 is arranged between the upper and lower fins 36 and 37, and is integrally connected to the upper and lower fins 36 and 37 by a pair of left and right end plates 38.

In the plan view shown in FIG. 4, the endplate 38 is inclined so that its rear edge approaches the rear end of the intermediate fin 33 toward the rear from the rear end side of the upper fin 36 and is also inclined so that its rear edge approaches the rear end of the intermediate fin 33 toward the rear from the rear end side of the lower fin 37.

As shown in FIG. 6, the end plate 38 is provided with a shaft portion 39.

The shaft portion 39 is formed so as to protrude in the left-right direction from the end plate 38 at a position corresponding to the center of the intermediate fin 33 in the front-rear direction.

In FIG. 6, as for the shaft portions 39 provided on the pair of end plates 38, description of the shaft portion 39 of the right end plate 38 is omitted for convenience of drawing.

When the drum fin 30 shown in FIG. 6 is arranged in the drum fin arrangement portion 8 (see FIG. 4), the drum fin 30 is rotatably supported by the side plate member 1c (see FIG. 3) of the case 1 (see FIG. 3) via the shaft portion 39.

Next, the link mechanism 31 (see FIG. 3) will be described.

As shown in FIG. 3, the link mechanism 31 includes a plate-shaped lever member 34 long in one direction and an arm member 35.

A shaft support portion 34a for the bezel member 1d and a grip portion 34b are formed at the rear portion of the lever member 34. As shown in FIG. 2, the grip portion 34b projects toward the vehicle interior side through a small hole formed in the bezel member 1d.

A long hole 34c is also formed in the front portion of the lever member 34.

As shown in FIG. 3, a pin portion 35a to be fitted into the long hole 34c of the lever member 34 is formed at the rear portion of the arm member 35. Further, in the front portion of the arm member 35, a hole portion 35b is formed to fix the shaft portion (not shown) provided on the right end plate 38 of the drum fin 30 by press fitting or the like, for example.

According to this link mechanism 31, when the user moves the grip portion 34b up and down, the drum fin 30 is rotated around the shaft portion 39 via the lever member 34 and the arm member 35.

<Operation of Blowout Structure>

Next, an operation of the blowout structure 10 according to this embodiment will be described.

Figure 7:
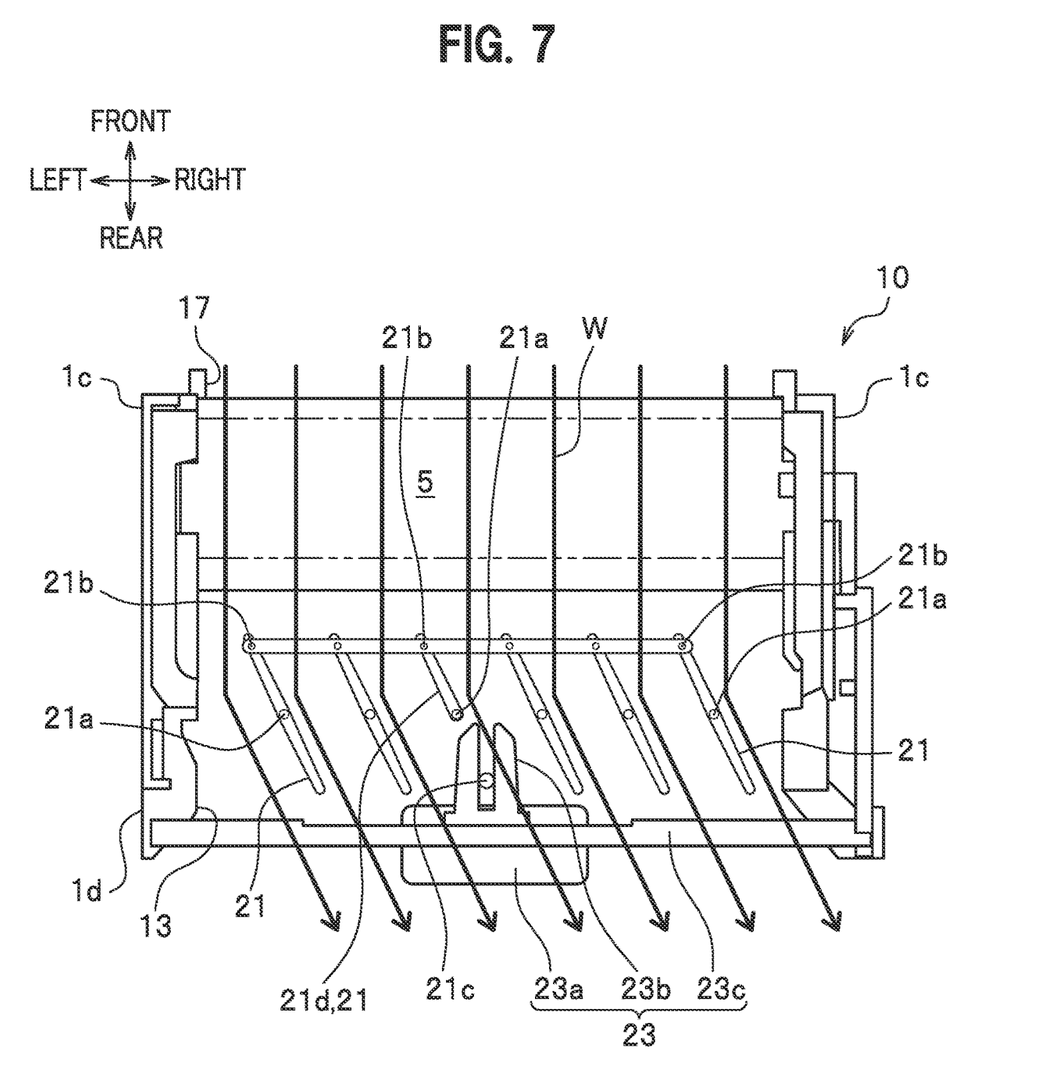
FIG. 7 is an operation explanatory diagram of the blowout structure when blowing air rightward.

FIG. 7 is an operation explanatory diagram of the blowout structure 10 when blowing air rightward.

As shown in FIG. 7, when the wind W is blown rightward from the outlet 13 of the blowout structure 10, the vertical fin 21 is tilted so that the rotating end located on the downstream side of the vertical fin 21 is separated from the inner wall surface of the left side plate member 1c. To be more specific, the grip portion 23a of the operator 23 shown in FIG. 2 is slid rightward.

In this event, the bifurcated portion 23b of the operator 23 shown in FIG. 7 moves the engaging pin 21c of the vertical fin 21d rightward. Thus, the vertical fin 21d is rotated counterclockwise about the rotation shaft 21a. Then, the other vertical fins 21 connected by the connecting member 22 via the connecting pins 21b of the vertical fins 21d are each rotated counterclockwise about each rotation shaft 21a in conjunction with the vertical fins 21d.

Thus, the vertical fin 21 is tilted so that the rotating end located on the downstream side is separated from the inner wall surface of the left side plate member 1c.

As shown in FIG. 7, the blowout structure 10 blows the wind W obliquely rightward from the outlet 13 to the vehicle interior R side.

Figure 8A:
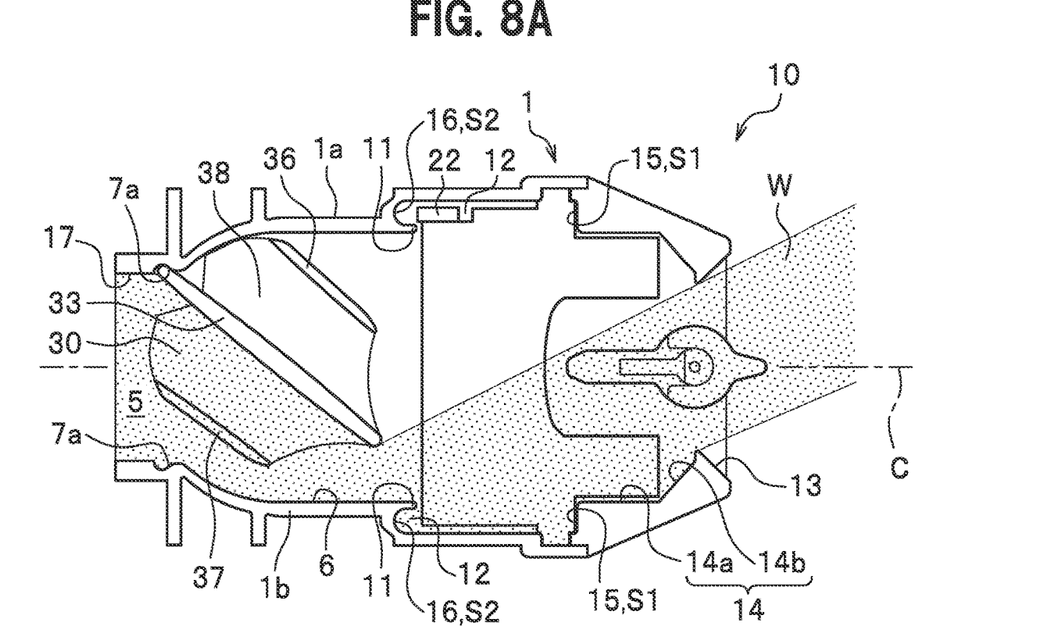
FIG. 8A is an operation explanatory diagram of the blowout structure when blowing air upward.
Figure 8B:
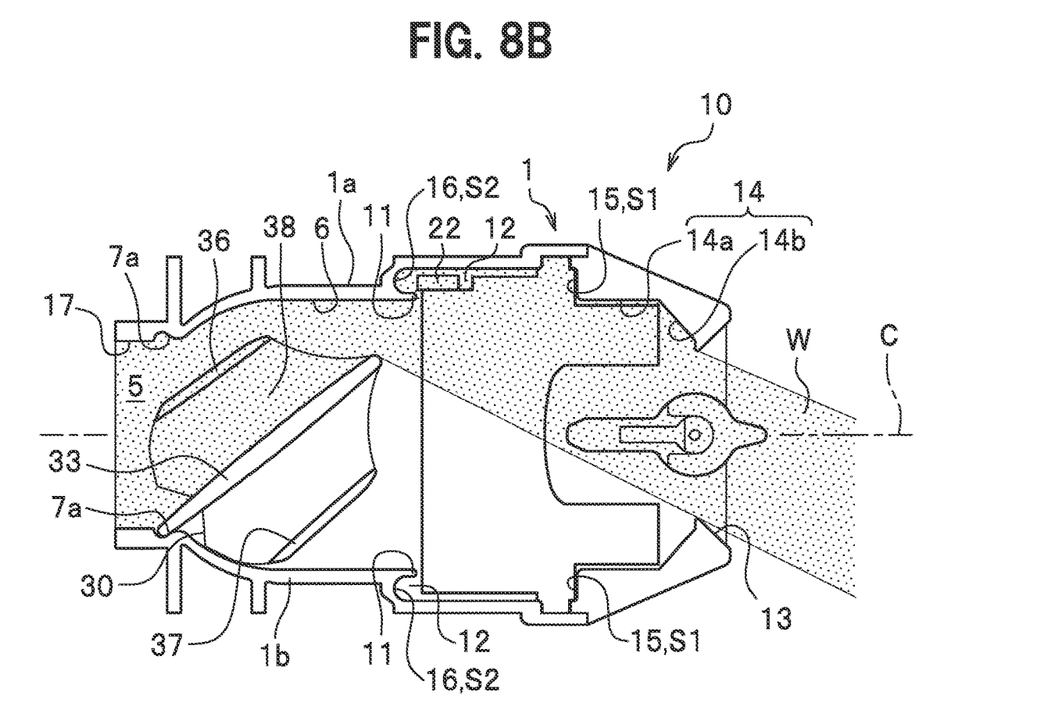
FIG. 8B is an operation explanatory diagram of the blowout structure when blowing air downward.

FIG. 8A is an operation explanatory diagram of the blowout structure 10 when blowing air upward. FIG. 8B is an operation explanatory diagram of the blowout structure 10 when blowing air downward.

As shown in FIG. 8A, when the wind W is blown upward from the outlet 13 of the blowout structure 10, the intermediate fin 33 of the drum fin 30 is tilted so that the downstream side of the intermediate fin 33 is separated downward from the center line C of the case 1. To be more specific, the grip portion 34b of the lever member 34 shown in FIG. 2 is slid upward from the neutral position.

In this event, in the link mechanism 31 shown in FIG. 3, the long hole 34c side of the lever member 34 is moved downward. The arm member 35 connected to the lever member 34 rotates the drum fin 30 around the shaft portion 39 so that the intermediate fin 33 faces downward. The intermediate fin 33 shown in FIG. 8A comes into contact with the upper stopper face 7a of the pair of stopper faces 7a as the lock.

Thus, the drum fin 30 blows the wind W obliquely downward with respect to the case inner wall 6 having the lower space portion 12, that is, the inner wall of the lower plate member 1b. Thereafter, the wind W flows backward along the inner wall of the lower plate member 1b and also flows into the airflow guide portion 14 of the bezel member 1d. To be more specific, the wind W flows along the lower inner wall surface of the general portion 14a of the bezel member 1d, and changes the flow to obliquely upward at the lower inclined portion 14b of the bezel member 1d.

As shown in FIG. 8A, the blowout structure 10 blows the wind W obliquely upward from the outlet 13 to the vehicle interior R (see FIG. 1) side.

As shown in FIG. 8B, when the wind W is blown downward from the outlet 13 of the blowout structure 10, the intermediate fin 33 is tilted so that the downstream side of the intermediate fin 33 of the drum fin 30 is separated upward from the center line C of the case 1. To be more specific, the grip portion 34b of the lever member 34 shown in FIG. 2 is slid downward from the neutral position.

In this event, in the link mechanism 31 shown in FIG. 3, the long hole 34c side of the lever member 34 is moved upward. The arm member 35 connected to the lever member 34 rotates the drum fin 30 around the shaft portion 39 so that the intermediate fin 33 faces upward. The intermediate fin 33 shown in FIG. 8B has its front end come into contact with the lower stopper face 7a of the pair of stopper faces 7a as the lock.

Thus, the drum fin 30 blows the wind W obliquely upward with respect to the case inner wall 6 having the upper space portion 12, that is, the inner wall of the upper plate member 1a. Thereafter, the wind W flows backward along the inner wall of the upper plate member 1a and also flows into the airflow guide portion 14 of the bezel member 1d. To be more specific, the wind W flows along the upper inner wall surface of the general portion 14a of the bezel member 1d and changes the flow to obliquely downward at the upper inclined portion 14b of the bezel member 1d.

As shown in FIG. 8B, the blowout structure 10 blows the wind W obliquely downward from the outlet 13 to the vehicle interior R (see FIG. 1) side.

Further, although not shown, when a wind W is blown straight backward from the outlet 13 of the blowout structure 10, the intermediate fin 33 of the drum fins 30 is arranged along a center line C of the case 1. To be more specific, the grip portion 34b of the lever member 34 shown in FIG. 2 is set in a neutral position.

Thus, the blowout structure 10 blows air from the air outlet 13 toward the vehicle interior R (see FIG. 1) so as to make the wind W travel straight backward.

Advantageous Effect

Next, an advantageous effect achieved by the blowout structure 10 of this embodiment will be described.

Figure 9A:
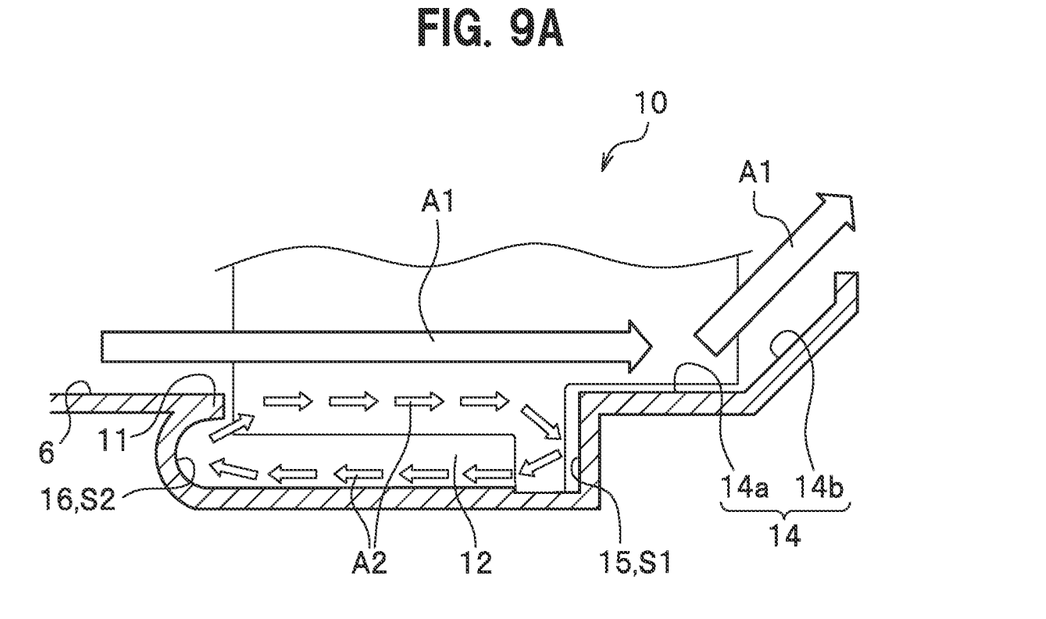
FIG. 9A is a schematic diagram of an airflow around a stepped space of the blowout structure.
Figure 9B:
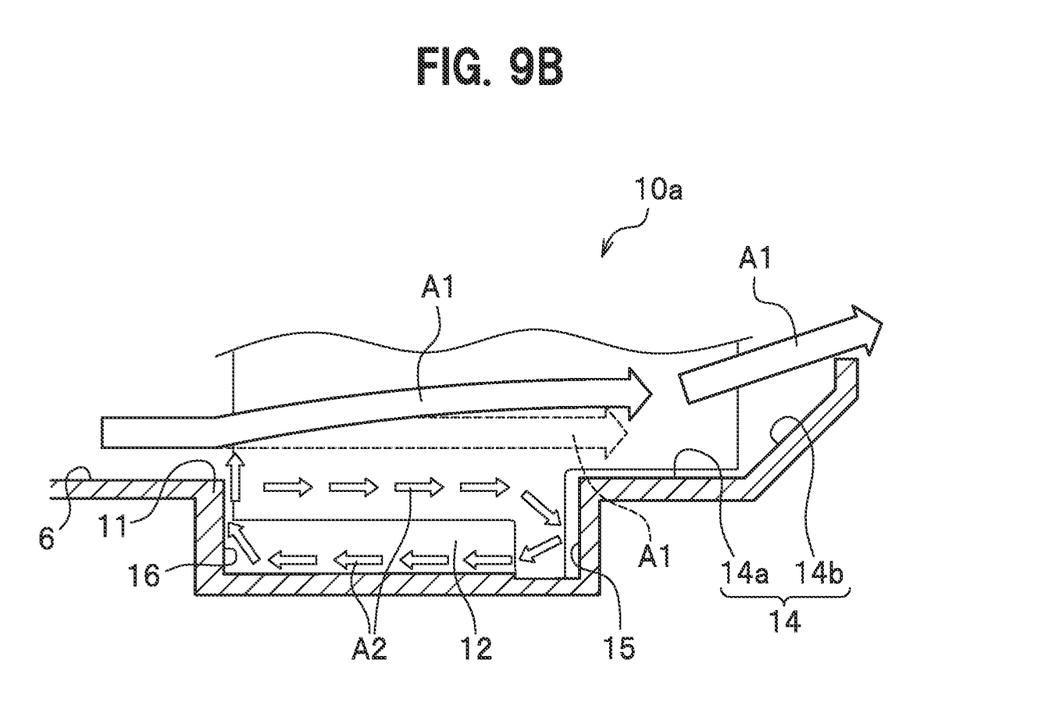
FIG. 9B is a schematic diagram of an airflow around a stepped space of a blowout structure according to a comparative example.

FIG. 9A is a schematic diagram of airflows A1 and A2 around the space portion 12 (step space) of the blowout structure 10. FIG. 9B is a schematic diagram of an airflow A1 and a circulating airflow A2 around the space portion 12 (step space) of a blowout structure 10a according to a comparative example.

Here, first, the blowout structure 10a according to the comparative example (see FIG. 9B) will be described.

As shown in FIG. 9B, in the blowout structure 10a, a vertical wall surface 15 and a vertical wall surface 16 facing each other in the front-rear direction across the space portion 12 (step space) are formed of flat surfaces parallel to each other.

In this blowout structure 10a, the airflow A1 flowing from the upstream side to the downstream side through the ventilation passage 5 forms the circulating airflow A2 inside the space portion 12. To be more specific, the circulating airflow A2 flows from the upstream side to the downstream side along the airflow A1 in the vicinity of the boundary between the ventilation passage 5 and the space portion 12, but some of the circulating airflow A2 is inverted by the vertical wall surface 15 and flows back to the vertical wall surface 16 side. Thereafter, the inverted part of the airflow turns back at the vertical wall surface 16 and flows again from the upstream side to the downstream side to circulate inside the space portion 12.

On the other hand, the remaining part of the inverted airflow hits the vertical wall surface 16 and then joins the ventilation passage 5 again.

Due to this merging, the airflow A1 flowing from the upstream side to the downstream side of the ventilation passage 5 on the case inner wall 6 side having the space portion 12 is lifted in a direction away from the flow indicated by the dotted line in FIG. 9B to the space portion 12, resulting in a displaced flow indicated by the solid line.

Thus, in the airflow A1 indicated by the solid line, wind direction control by the airflow guide portion 14 is insufficient in the bezel member 1d, resulting in reduction in the directivity of the wind W (see FIGS. 8A and 8B).

On the other hand, in the blowout structure 10 according to the embodiment of the present invention, as shown in FIG. 8A, the vertical wall surface 16 serves as the reverse surface S2 that actively reverses the airflow flowing back from the vertical wall surface 15 side. Thus, the blowout structure 10 suppresses the merging of the circulating airflow A2 with the airflow A1 in the ventilation passage 5. Therefore, the wind direction control based on the airflow A1 in the airflow guide portion 14 is effectively performed.

According to this blowout structure 10, good airtightness can be achieved by forming the vertical wall surface 15 as the contact surface S1 of the vertical fin 21 in the fin shut state. Further, according to the blowout structure 10, by forming the vertical wall surface 16 facing the vertical wall surface 15 as the reverse surface S2, the air flow A1 is effectively controlled by the airflow guide portion 14. As a result, good directivity of the wind W can be achieved as compared with conventional structures.

In the blowout structure 10 of this embodiment, the reverse surface S2 has the reverse portion 11 protruding toward the downstream side on the ventilation passage 5 side.

According to this blowout structure 10, the merging of the circulating airflow A2 with the airflow A1 in the ventilation passage 5 is more effectively suppressed. The blowout structure 10 has further improved directivity of the wind W.

The reverse surface S2 of the blowout structure 10 of this embodiment is configured to have the curved surface that is recessed toward the upstream side.

According to this blowout structure 10, the merging of the circulating airflow A2 with the airflow A1 in the ventilation passage 5 is suppressed even more effectively. The blowout structure 10 has even further improved directivity of the wind W.

Further, in the blowout structure 10 of this embodiment, the connecting member 22 included in the rotation mechanism for rotating the vertical fin 21 is provided in the space portion 12 formed between the contact surface S1 and the reverse surface S2.

According to this blowout structure 10, the space portion 12 can be efficiently used unlike the one in which the rotation mechanism such as the connecting member 22 is arranged in a chamber separated from the ventilation passage 5 with a predetermined partition wall in the case 1. Thus, the blowout structure 10 can be made compact.

Further, the blowout structure 10 of this embodiment further includes the second wind direction adjuster 3 (another wind direction adjuster) arranged inside the case 1 on the upstream side of the first wind direction adjuster 2 (wind direction adjuster).

According to this blowout structure 10, the direction of the wind W blown out through the outlet 13 can be changed by the second wind direction adjuster 3 to a direction different from that of the first wind direction adjuster 2. In the ventilation passage 5, the blast direction can be controlled so as to be along the case inner wall 6 side having the space portion 12 (contact portion S1). The blowout structure 10 can expand the range of choices for the blowing direction of the wind W while setting high directivity of the wind W.

Although the embodiment has been described above, the present invention is not limited to this embodiment and can be implemented in various forms.

What is claimed is:

1. A blowout structure of an air conditioner comprising:
a case having a ventilation passage inside; and
a wind direction adjuster that is arranged in the case, is configured to change a direction of wind blown out according to a rotation angle, and closes the ventilation passage so as to inhibit blowout of the wind,
wherein
a contact surface and a reverse surface are formed inside the case,
the contact surface is formed so as to extend in a direction of intersecting with an extending direction of the ventilation passage and extending away from the ventilation passage, and the contact surface being formed so as to come into contact with the wind direction adjuster in a state of closing the ventilation passage,
the reverse surface is provided so as to face the contact surface on the upstream side of the contact surface and allows an airflow flowing back to the upstream side from the contact surface to be reversed to the downstream side, and
the reverse surface has a reverse portion protruding toward the downstream side on the ventilation passage side.

2. The blowout structure of an air conditioner according to claim 1, wherein
the reverse surface includes a curved surface that is recessed toward the upstream side.

3. The blowout structure of an air conditioner according to claim 1, wherein
a rotation mechanism of the wind direction adjuster is arranged in a space portion formed between the contact surface and the reverse surface.

4. The blowout structure of an air conditioner according to claim 1, further comprising:

another wind direction adjuster arranged inside the case on the upstream side of the wind direction adjuster.

* * * * *